R. AYRES.
Sled Brake.
No. 86,052.
Patented Jan. 19, 1869.
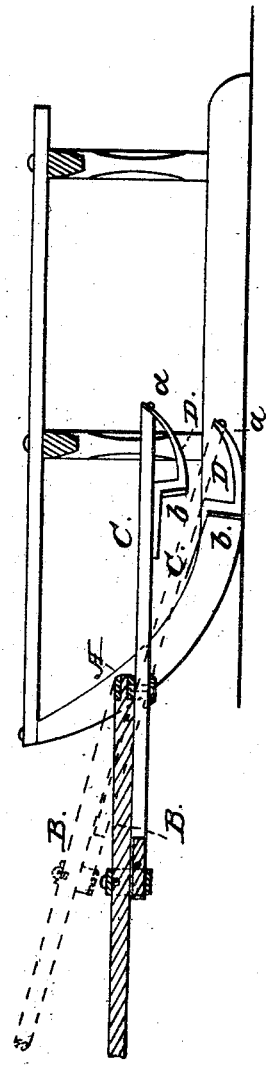
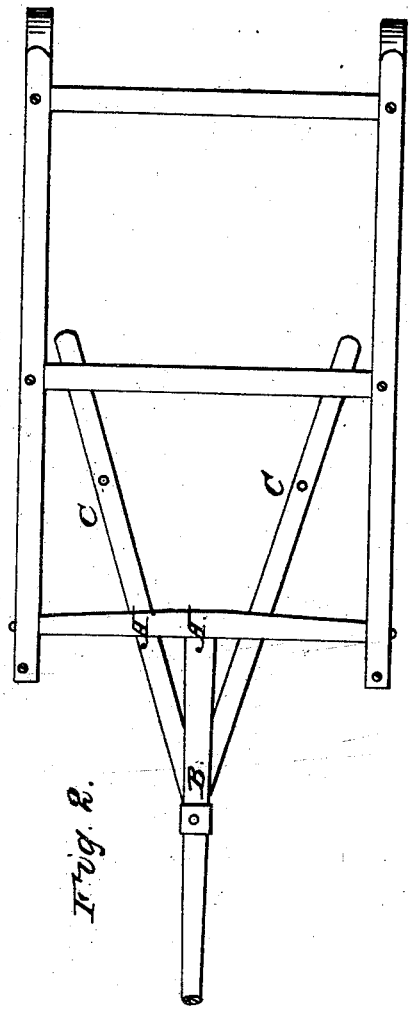
Witnesses
Inventor

ROBERT AYRES, OF VIENNA, NEW JERSEY.

*Letters Patent No. 86,052, dated January 19, 1869.*

IMPROVEMENT IN BRAKES FOR SLEDS.

*The Schedule referred to in these Letters Patent and making part of the same.*

*To all whom it may concern:*

Be it known that I, ROBERT AYRES, of Vienna, in the county of Warren, and State of New Jersey, have invented a new and useful Improvement in Brakes for Sleds, Sleighs, &c.; and I do hereby declare the following to be a full, clear, and exact description thereof, sufficient to enable others skilled in the art to which my invention appertains, to fully understand and use the same, reference being had to the accompanying drawings, forming part of this specification, and in which—

Figure 1 is a section of a sled, with my improved brake attached thereto.

Figure 2 is a top view thereof.

My invention belongs to that class of sled-brakes which are automatically operated by the horses when held in, or when descending a hill.

The object of my invention is to simplify the construction of such brakes, and to obtain one which would not fail to operate effectively. To accomplish these ends, My invention consists in attaching to the transverse rock-bar, in which the tongue is fixed, one or more rear extensions, provided, at the outer end, with spurs, the whole being so arranged that, when the horses are held in, and the outer end of the pole thereby elevated, the spurs are depressed, so as to penetrate the surface over which the sled is passing, and thus to lessen or entirely stop the motion of the vehicle, as may be desired.

It has been found that, when the tongue is simply attached to a rock-bar, without any rear extension, the tongue will, when the horses are held back, rise so high as to prevent the horses from exerting a backward pressure.

When the tongue is elevated too high, the horses are almost lifted from the ground, and the pressure is exerted downward, which, instead of stopping the progress of the sled, has a tendency to overturn the same.

My invention is designed to obviate this defect, and, for this purpose simply, it may be found unnecessary to use the spurs; but I prefer to combine the latter with the rear extensions, as thereby the extreme elevation of the tongue is prevented, and an effective brake is produced.

In order to enable others to fully understand my invention, so as to be able to make and apply my improved brake, I will now proceed to describe the same more fully in detail.

In the drawings—

A represents a transverse rock-bar, fitted between the upper parts of the runners of a sled or sleigh, in the ordinary manner.

In this cross-bar the tongue B is fitted, as usual.

C C are bars, which are attached to the under side of the tongue and rock-bar, and extending to the rear of the latter.

In this instance of my invention, I have shown two bars, diverging as they extend rearward. It may, however, be found sufficient to employ a single bar, C, centrally secured, and extended backward, in line with the tongue.

To the rear end of the bar or bars C, I prefer to attach metallic spurs, D, affixed to the under side of the bars C.

These spurs may be of the form shown in the drawing, or of other suitable shape, the main point being to provide a sharp point or edge, to penetrate the surface over which the sled may pass. I, however, prefer to make them as shown, that is, with a penetrating-point or edge, $b$, and a curved surface, $a$.

This latter is an important feature, for this reason:

Although the point $b$ may have penetrated the surface, this does not prevent the backing of the sled, because of the curve $a$, as will be obvious.

The operation is as follows:

In descending a hill, the horses will naturally hold back, and this causes the elevation of the outer end of the tongue, and the partial turning of the rock-bar, to which said tongue is attached.

Simultaneously with the elevation of the tongue, occurs the depression of the bars C, on account of their rigid attachment to the rock-bar and tongue.

As the depression of the bars C continues, the spurs thereto affixed are caused to penetrate the surface of ice, snow, or earth, over which the sled is passing, thus lessening the speed of the sled, or entirely stopping it.

As the horses resume their natural gait, the tongue is depressed, and the bars C elevated, so that the spurs are lifted from the surface, and the brake becomes, for the time, inoperative.

It will be understood that my improvement is applicable to sleds or sleighs of any kind, and may be put on when the vehicle is first constructed, or at any period thereafter, the application of the brake requiring no peculiar construction of the sled proper.

The simplicity, durability, and obvious effectal operation of my brake, together with its ready application to sleds, of any construction, at any time, constitute its main recommendations.

Having thus described my invention, I wish to state that I do not claim broadly an automatic sled-brake. On the other hand, I do not propose to limit myself to the precise construction herein described, as I am aware that the construction may be varied without departing from the principles of my invention; but

What I do claim as new, and desire to secure by Letters Patent, is—

1. The spurs D, constructed with a curved surface, $a$, and a penetrating-point or edge, whereby they serve as brakes, without hindering the backing of the vehicle, substantially as herein set forth.

2. The bars C, provided with spurs, when attached to the rock-bar A, in which the tongue is fixed, to operate as set forth, in combination with any sled or sleigh.

To the above specification of my improvement in brakes for sleds, I have signed my name, this 29th day of December, 1868.

ROBERT AYRES.

Witnesses:
JACOB F. HENRY,
GEO. W. ROTHWELL.